(12) United States Patent
Chang

(10) Patent No.: US 11,489,357 B2
(45) Date of Patent: Nov. 1, 2022

(54) BATTERY CHARGING CIRCUIT, CONTROL CIRCUIT AND ASSOCIATED CONTROL METHOD

(71) Applicant: Chengdu Monolithic Power Systems Co., Ltd., Chengdu (CN)

(72) Inventor: Junchang Chang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 92 days.

(21) Appl. No.: 16/705,757

(22) Filed: Dec. 6, 2019

(65) Prior Publication Data

US 2020/0185949 A1 Jun. 11, 2020

(30) Foreign Application Priority Data

Dec. 7, 2018 (CN) .......................... 201811492794.2

(51) Int. Cl.
*H02J 7/00* (2006.01)
(52) U.S. Cl.
CPC ........ *H02J 7/00714* (2020.01); *H02J 7/0047* (2013.01)
(58) Field of Classification Search
CPC .................................................. H02J 7/0068
See application file for complete search history.

(56) References Cited

U.S. PATENT DOCUMENTS

| 9,018,921 | B2* | 4/2015 | Gurlahosur | H02J 7/00718 |
| | | | | 320/164 |
| 10,110,037 | B2 | 10/2018 | Ouyang | |
| 2011/0133700 | A1* | 6/2011 | Martin | H02J 9/061 |
| | | | | 320/145 |
| 2013/0043828 | A1* | 2/2013 | Gurlahosur | H02J 7/007184 |
| | | | | 320/107 |
| 2015/0194826 | A1* | 7/2015 | Xu | H02J 7/00043 |
| | | | | 320/107 |
| 2016/0211691 | A1* | 7/2016 | Chen | H02J 7/0068 |
| 2019/0013733 | A1* | 1/2019 | Trichy | H02M 3/158 |
| 2019/0252896 | A1* | 8/2019 | Huang | H02M 3/00 |

OTHER PUBLICATIONS

U.S. Appl. No. 16/440,936, filed Jun. 13, 2019, Monolithic Power Systems, Inc.

* cited by examiner

*Primary Examiner* — Drew A Dunn
*Assistant Examiner* — Tynese V McDaniel
(74) *Attorney, Agent, or Firm* — Perkins Coie LLP

(57) ABSTRACT

A battery charging circuit providing a charging current to a battery via a charging transistor. A control circuit used to control the battery charging circuit has a system voltage control loop providing a system voltage compensation signal, a charging current control loop providing a charging current compensation signal and a charging transistor control loop providing a charging regulation signal based on a charging transistor reference signal and the system voltage feedback signal.

14 Claims, 7 Drawing Sheets

BATTERY CHARGING CIRCUIT, CONTROL CIRCUIT AND ASSOCIATED CONTROL METHOD

CROSS-REFERENCE TO RELATED APPLICATION(S)

This application claims the benefit of CN application No. 201811492794.2 filed on Dec. 7, 2018 and incorporated herein by reference.

TECHNICAL FIELD

This disclosure relates generally to electrical circuit, and more particularly but not exclusively relates to a battery charging circuit.

BACKGROUND

Li-ion or Li-polymer and other chargeable batteries make the portable devices to have smaller size and higher mobility. To ensure the good performance of the batteries, the batteries should be charged suitably during practical application.

For a battery charging circuit, charging variables, such as system voltage, charging current and battery voltage are carefully controlled in order to meet different applications. Since charging current has an important influence on the battery life, providing a required charging current to charge a battery is one of the important battery control stages. Therefore, it is desired to provide a battery charging circuit with a better performance on charging current control.

SUMMARY

In accomplishing the above and other objects, there has been provided a control circuit for a battery charging circuit in accordance with an embodiment of the present invention. The battery charging circuit comprises a switching circuit having an output terminal to provide a system voltage, the output terminal of the switching circuit is further coupled to a battery to provide a charging current to the battery via a charging transistor, wherein the battery has a battery voltage indicative of the battery charging status, the control circuit may comprises a system voltage control loop, a charging current control loop, a charging transistor control loop and a switching control circuit. Wherein the system voltage control loop is configured to receive a system voltage reference signal and a system voltage feedback signal indicative of the system voltage, and is configured to provide a system voltage compensation signal based on the system voltage reference signal and the system voltage feedback signal. The charging current control loop is configured to receive a charging current reference signal and a charging current feedback signal indicative of the charging current, and is configured to provide a charging current compensation signal based on the charging current reference signal and the charging current feedback signal. The charging transistor control loop is configured to receive a charging transistor reference signal and the system voltage feedback signal, and is configured to provide a charging regulation signal to control the charging transistor based on the charging transistor reference signal and the system voltage feedback signal. The switching control circuit is configured to receive the system voltage compensation signal and the charging current compensation signal, and is configured to provide a switching control signal to control the switching circuit based on the charging current compensation signal and the system voltage compensation signal.

There has also been provided a battery charging circuit in accordance with an embodiment of the present invention. The battery charging circuit may comprise a switching circuit, a system voltage control loop, a charging current control loop and a charging transistor control loop. The switching circuit has an output terminal configured to provide a system voltage, the output terminal of the switching circuit is further coupled to the battery to provide a charging current to a battery via a charging transistor, wherein the battery has a battery voltage indicative of the battery charging status. The system voltage control loop is configured to receive a system voltage reference signal and a system voltage feedback signal indicative of the system voltage, and is configured to provide a system voltage compensation signal based on the system voltage reference signal and the system voltage feedback signal. The charging current control loop is configured to receive a charging current reference signal and a charging current feedback signal indicative of the charging current, and is configured to provide a charging current compensation signal based on the charging current reference signal and the charging current feedback signal. The charging transistor control loop is configured to receive a charging transistor reference signal and the system voltage feedback signal, and is configured to provide a charging regulation signal to control the charging transistor based on the charging transistor reference signal and the system voltage feedback signal. The switching control circuit is configured to receive the system voltage compensation signal and the charging current compensation signal, and is configured to provide a switching control signal to control the switching circuit based on the charging current compensation signal and the system voltage compensation signal There has also been provided a control method for a battery charging circuit in accordance with an embodiment of the present invention. The control method for a battery charging circuit, the battery charging circuit comprising a switching circuit having an output terminal configured to provide a system voltage, the output terminal of the switching circuit is further coupled to a battery to provide a charging current to the battery via a charging transistor, wherein the battery has a battery voltage indicative of the battery charging status, the control method may comprises: providing a system voltage compensation signal based on a system voltage reference signal and a system voltage feedback signal indicative of the system voltage; providing a charging current compensation signal based on a charging current reference signal and a charging current feedback signal indicative of the charging current; providing a charging regulation signal to control the charging transistor based on a charging transistor reference signal and the system voltage feedback signal; and providing a switching control signal to control the switching circuit based on the system voltage compensation signal and the charging current compensation signal.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
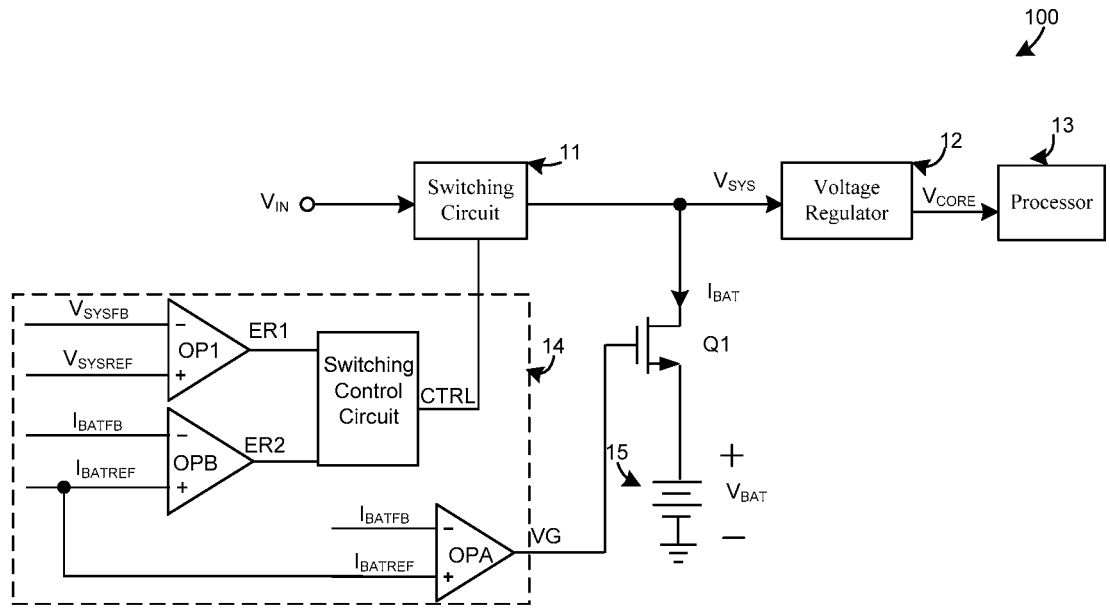
FIG. 1 illustrates a block diagram of a prior electric system 100.

FIG. 1 illustrates a block diagram of a prior electric system 100. The electric system 100 comprises a battery charging circuit, a voltage regulator (VR)12, a battery 15 and a processor 13. The battery charging circuit comprises a switching circuit 11, a charging transistor Q1 and a charging regulation circuit 14. The processor 13 maybe a computing processing unit (CPU), a graphic processing unit (GPU) or an application specific integrated circuit (ASIC). The switching circuit 11 has an input terminal to receive an input voltage $V_{IN}$ and an output terminal to provide a system voltage $V_{SYS}$ to the voltage regulator 12. When an external power supply is disconnected from the switching circuit 11, i.e. the input voltage $V_{IN}$ equals zero, the battery 15 provides the system voltage $V_{SYS}$ to the voltage regulator 12 via the charging transistor Q1. When the external power supply is connected to the switching circuit 11, for example, an external AC power supply or an external DC power supply is connected to the switching circuit 11 through an appropriate adapter, the external power supply provides the system voltage $V_{SYS}$ via the switching circuit 11, and provides a charging current $I_{BAT}$ to charge the battery 15 via the charging transistor Q1. The voltage regulator 12 converts the system voltage $V_{SYS}$ to a processor voltage $V_{CORE}$ to the processor 13.

Figure 2:
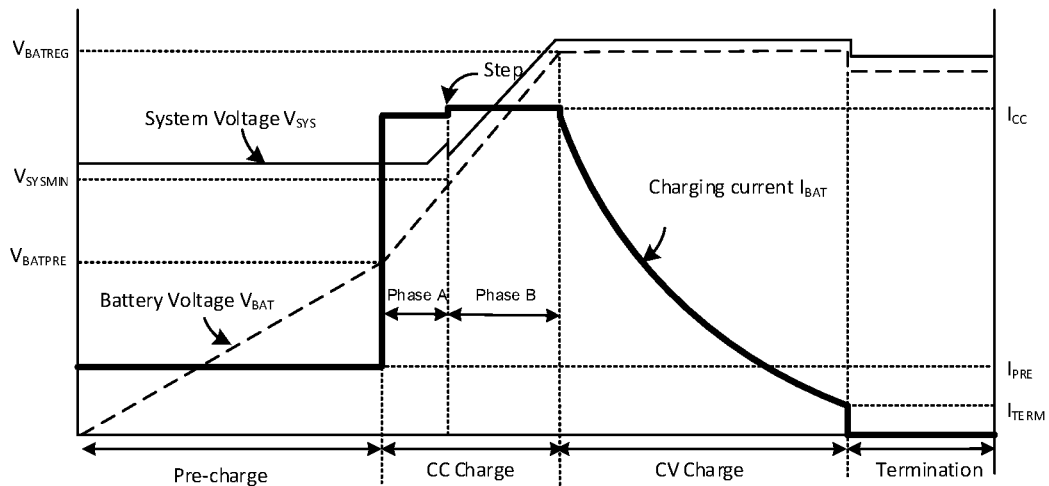
FIG. 2 illustrates current and voltage waveforms of the prior electric system 100 shown in FIG. 1 during a charging process.

FIG. 2 illustrates current and voltage waveforms of the prior electric system 100 shown in FIG. 1 during a charging process. As shown in FIG. 2, the charging process can be split into pre-charge stage, CC (constant current) charge stage, CV (constant voltage) charge stage and termination stage based on the battery voltage $V_{BAT}$. In the pre-charge stage, the battery 15 is charged at the charging current $I_{BAT}$ that equals a pre-charge current threshold $I_{PRE}$ and the system voltage $V_{SYS}$ is regulated and maintained at a pre-determined threshold which is less than a system voltage minimum threshold $V_{SYSMIN}$. The battery voltage $V_{BAT}$ continues increasing with charging, and when the battery voltage $V_{BAT}$ increases to a pre-charge voltage threshold $V_{BATPRE}$, the pre-charge stage ends and the CC charge stage starts. In the CC charge stage, the battery 15 is charged quickly at the charging current $I_{BAT}$ that equals a CC current threshold $I_{CC}$. The battery voltage $V_{BAT}$ continues increasing with charging, and when the battery Voltage $V_{BAT}$ increases to a CV voltage threshold $V_{BATREG}$, the CC charge stage ends and the CV charge stage starts. In the CV charge stage, the charging current $I_{BAT}$ is decreased gradually and the system voltage $V_{SYS}$ is regulated and maintained at a CV voltage threshold $V_{BATREG}$. The fourth stage begins when the charging current $I_{BAT}$ decreases to a charging termination threshold $I_{TERM}$. The fourth stage is the termination stage, the battery 15 is nearly full, and the charging process is complete.

Referring to FIG. 1, the charging regulation circuit 14 comprises a system voltage control loop OP1, a first charging current control loop OPA and a second charging current control loop OPB. The CC charge stage illustrated in FIG. 2 can be split to phase A and phase B based on the battery voltage $V_{BAT}$. The battery charging circuit works in phase A if the battery voltage $V_{BAT}$ is less than the system voltage minimum threshold $V_{SYSMIN}$, and works in phase B if the battery voltage $V_{BAT}$ is higher than the system voltage minimum threshold $V_{SYSMIN}$. In phase A of the CC charge stage, both the system voltage control loop OP1 and the first charging current control loop OPA take effort. The switching control circuit is configured to provide a switching control signal CTRL to control and maintain the system voltage $V_{SYS}$ at the predetermined threshold based on a system voltage feedback signal $V_{SYSFB}$ and a system voltage reference signal $V_{SYSREF}$. A charging regulation signal VG is generated to control and maintain the charging current $I_{BAT}$ at a CC charge current threshold $I_{CC}$ based on a charging current feedback signal $I_{BATFB}$ and a charging current reference signal $I_{BATREF}$. In phase B of the CC charge stage, the first charging current control loop OPA is disabled and the second charging current loop OPB takes effort, the switching control circuit is configured to provide the switching control signal CTRL to control and maintain the charging current $I_{BAT}$ at the CC charge threshold $I_{CC}$ based on the charging current feedback signal $I_{BATFB}$ and the charging current reference signal $I_{BATREF}$.

It can be seen from above description that, the regulation of the charging current $I_{BAT}$ is switched from the first charging current control loop OPA to the second charging current control loop OPB when the battery charging circuit transits from phase A to phase B. Both the first charging current control loop OPA and the second charging current control loop OPB control the charging current $I_{BAT}$ based on the charging current reference signal $I_{BATREF}$. However due to manufacturing process, parasitic parameters and other influencing factors, the input error, loop error and some other uncontrollable error between the first charging current control loop OPA and the second charging current control loop OPB cannot be eliminated but only be made as small as possible, thus the charging current $I_{BAT}$ will have a step at the moment switching from the first control loop OPA to the second control loop OPB. The step (shown in FIG. 2) is uncontrollable, it may be an upward step or a downward step. In some application, this current step is not allowed and it is desired to provide a charging current with no step.

Figure 3:
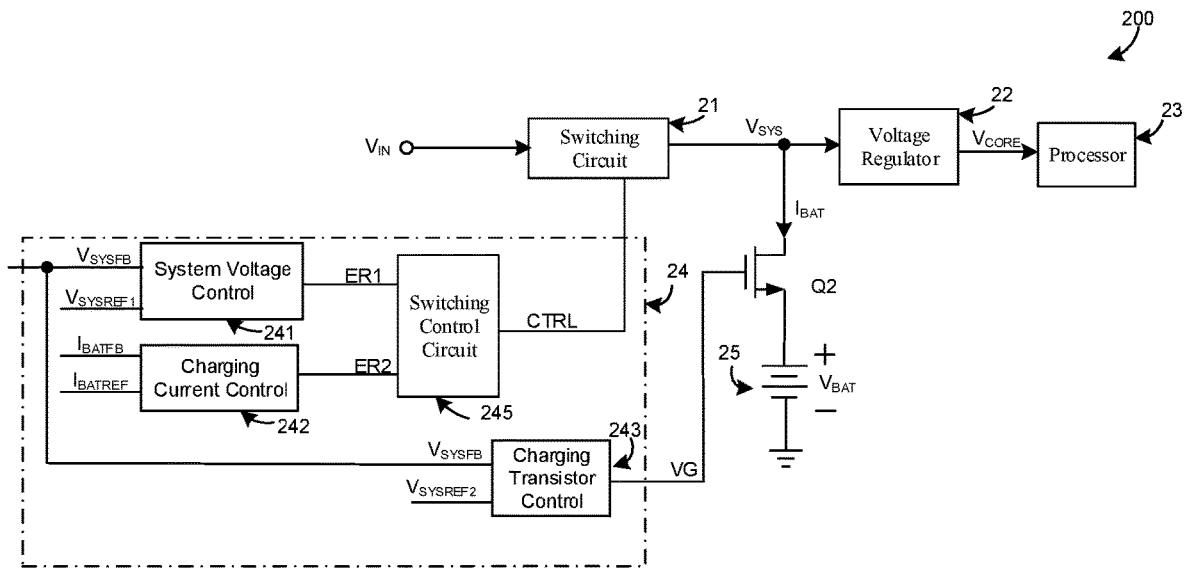
FIG. 3 illustrates a circuit block diagram of an electric system 200 according to an embodiment of the present invention.

FIG. 3 illustrates a circuit block diagram of an electric system 200 according to an embodiment of the present invention. The electric system 200 comprises a battery charging circuit, a battery 25, a voltage regulator (VR) 22 and a processor 23. The battery charging circuit comprises a switching circuit 21, a charging transistor Q2 and a control circuit 24. The switching circuit 21 has an input terminal to receive an input voltage $V_{IN}$ and an output terminal to provide a system voltage $V_{SYS}$ to the voltage regulator 22. When an external power supply is disconnected from the switching circuit 21, i.e. the input voltage $V_{IN}$ equals zero, the battery 25 provides the system voltage $V_{SYS}$ to the voltage regulator 22 through the charging transistor Q2. When the external power supply is connected to the switching circuit 21, for example, an external AC power supply or an external DC power supply is connected to the switching circuit 21 through an appropriate adapter, the external power supply provides the system voltage $V_{SYS}$ via the switching circuit 21, and providing a charging current $I_{BAT}$ to charge the battery 25 via the charging transistor Q2, wherein the battery 25 has a battery voltage $V_{BAT}$ indicative of the battery charging status. The voltage regulator 22 converts the system voltage $V_{SYS}$ to a processor voltage $V_{CORE}$ to the processor 23. The switching circuit 21 comprises at least one switch and an inductor coupled to the at least one switch. The control circuit 24 provides a switching control signal CTRL to control the switching circuit 21 and a charging regulation signal VG to control the charging transistor Q2.

Referring to FIG. 3, the control circuit 24 comprises a system voltage control loop 241, a charging current control loop 242, a charging transistor control loop 243 and a switching control circuit 245. The system voltage control loop 241 is configured to receive a system voltage reference signal $V_{SYSREF1}$ and a system voltage feedback signal $V_{SYSFB}$ indicative of the system voltage $V_{SYS}$, and configured to generate a system voltage compensation signal ER1 to the switching control circuit 245 based on the system voltage reference signal $V_{SYSREF1}$ and the system voltage feedback signal $V_{SYSFB}$. The charging current control loop 242 is configured to receive a charging current reference signal $I_{BATREF}$ and a charging current feedback signal $I_{BATFB}$ indicative of the charging current $I_{BAT}$, and configured to generate a charging current compensation signal ER2 based on the charging current reference signal $I_{BATREF}$ and the charging current feedback signal $I_{BATFB}$. The charging transistor control loop 243 is configured to receive a charging transistor reference signal $V_{SYSREF2}$ and the system voltage feedback signal $V_{SYSFB}$, and configured to provide a charging regulation signal VG to control the charging transistor Q2 based on the charging transistor reference signal $V_{SYSREF2}$ and the system voltage feedback signal $V_{SYSFB}$.

Figure 4:
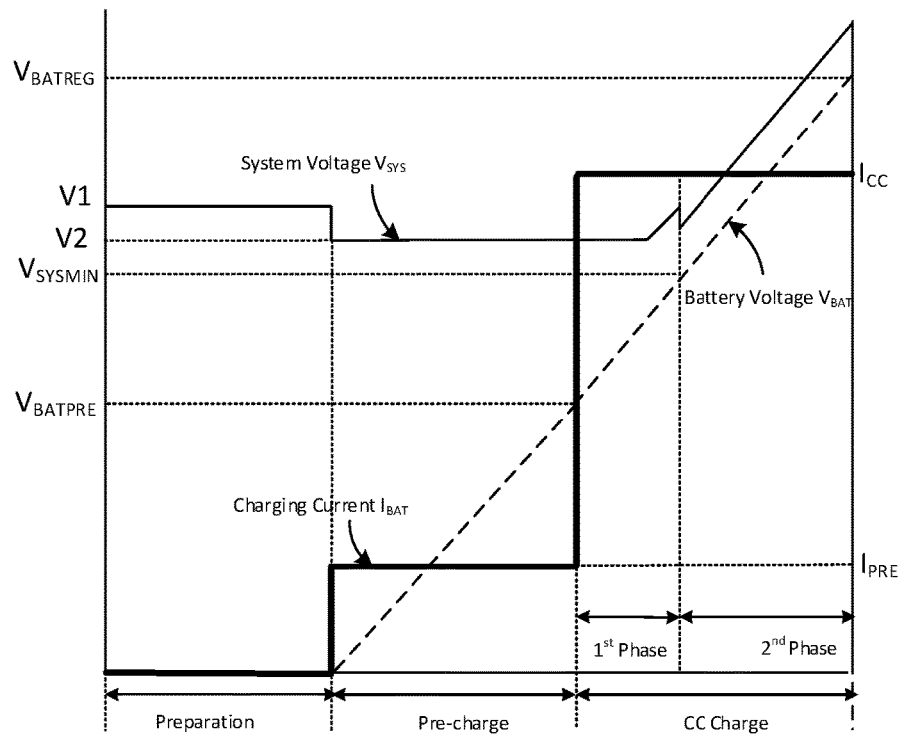
FIG. 4 illustrates the system voltage $V_{SYS}$, the battery voltage $V_{BAT}$ and the charging current $I_{BAT}$ in a charging process of the electric system 200 shown in FIG. 3 according to one embodiment of the present invention.

FIG. 4 illustrates the system voltage $V_{SYS}$, the battery voltage $V_{BAT}$ and the charging current $I_{BAT}$ in a charging process of the electric system 200 shown in FIG. 3 according to one embodiment of the present invention. The charging process can be split into preparation stage, pre-charge stage, CC charge stage, CV charge stage and termination stage based on the battery voltage $V_{BAT}$. Here only preparation stage, pre-charge stage and CC charge stage are illustrated in FIG. 3 for simplicity. In preparation stage, the system voltage control loop 241 takes effort and the switching circuit 21 is configured to provide the switching control signal CTRL to control and maintain the system voltage $V_{SYS}$ at a first voltage threshold V1. The charging transistor control loop 243 takes effort and the charging transistor Q2 is turned off by the charging regulation signal VG. The charging regulation signal VG is in a first state and the charging current $I_{BAT}$ equals zero. In one embodiment, the internal signals and/or the battery state are detected during the preparation stage to indicate whether ready to enter the pre-charge stage. In another embodiment, the battery charging circuit enters the pre-charge stage once the system voltage $V_{SYS}$ is regulated and maintained as the first voltage threshold V1 for a period of time.

The battery charging circuit enters the pre-charge stage once preparation stage ends. In the pre-charge stage, the charging current control loop 242 takes effort, the charging current reference signal $I_{BATREF}$ equals a pre-charge current reference $I_{PREREF}$ and the charging current $I_{BAT}$ is controlled and maintained at a pre-charge current threshold $I_{PRE}$. The charging transistor control loop 243 takes effort, the charging transistor Q2 is controlled to operate in its saturation region to regulate and maintain the system voltage $V_{SYS}$ at a second voltage threshold V2 by the charging regulation signal VG. When the charging transistor Q2 operates in its saturation region, the on resistance $R_{DS}$ of the charging transistor Q2 is variable. The charging regulation signal VG tunes the on resistance $R_{DS}$ of the charging transistor Q2 to regulate and maintain the sum of the battery voltage $V_{BAT}$ and the voltage drop $V_{DS}$ of the charging transistor Q2 at the second voltage threshold V2, wherein the first voltage threshold V1 is higher than the second voltage threshold V2. The sum of the battery voltage $V_{BAT}$ and the transistor voltage drop $V_{DS}$, i.e., the system voltage $V_{SYS}$ would be $V_{SYS}=V_{BAT}+R_{DS}*I_{BAT}=V2$. In this fashion, if the charging current $I_{BAT}$ decreases, the on resistance $R_{DS}$ of the charging transistor Q2 will increase, while if the charging current $I_{BAT}$ increases, the on resistance $R_{DS}$ of the charging transistor Q2 will decrease.

The CC charge stage which can be split to a first phase and a second phase based on the battery voltage $V_{BAT}$. If the battery voltage $V_{BAT}$ is less than a system voltage minimum threshold $V_{SYSMIN}$, the battery charging circuit enters the first phase of the CC charge stage. In the first stage of CC-charge stage, the charging current control loop 242 takes effort, and the charging current reference signal $I_{BATREF}$ equals a CC charge current reference $I_{CCREF}$, and the charging current $I_{BAT}$ is controlled and maintained at a CC charge current threshold $I_{CC}$. The charging transistor Q2 is controlled to operate in its saturation region by the charging regulation signal VG. When the charging transistor Q2 operates in its saturation region, the same as in the pre-charge stage, the on resistance $R_{DS}$ of the charging transistor Q2 is variable. The charging regulation signal VG tunes the on resistance $R_{DS}$ of the charging transistor Q2 to regulate and maintain the sum of the battery voltage $V_{BAT}$ and the voltage drop $V_{DS}$ across the charging transistor Q2 at the second voltage threshold V2. The sum of the battery voltage $V_{BAT}$ and the transistor voltage drop $V_{DS}$, i.e., the system voltage $V_{SYS}$ would be $V_{SYS}=V_{BAT}+V_{DS}=V_{BAT}+R_{DS}*I_{BAT}=V2$.

If the battery voltage $V_{BAT}$ is higher than the system voltage minimum threshold $V_{SYSMIN}$, the battery charging circuit enters the second phase of the CC charge stage. In the second phase of the CC charge stage, the charging current control loop 242 takes effort, and the charging current reference signal $I_{BATREF}$ equals a CC charge current reference $I_{CCREF}$, and the charging current $I_{BAT}$ is controlled and maintained at a CC charge current threshold $I_{CC}$. The charging transistor control loop 243 takes effort, the charging transistor Q2 is controlled to operate in its linear region by the charging regulation signal VG. In one embodiment, the charging regulation signal VG is in a second state to control the charging transistor Q2 to operate in its linear region. When the charging transistor Q2 operates in its linear region, the charging transistor Q2 operates as a switch element that can perform on and off switching, and the on resistance $R_{DS}$ of the charging transistor Q2 operating in the linear region maybe substantially constant and relatively small, assume an resistance $R_{DS}$ of the charging transistor Q2 operating in the linear region is 10 mci, if the charging current $I_{BAT}$ is 1 A, the voltage drop $V_{DS}$ across the charging transistor Q2 would be $V_{SYS}=10$ m$\Omega$*1 A=10 mV. In the second phase of the CC charge stage, the system voltage $V_{SYS}$ is increasing with the charging current $I_{BAT}$, and system voltage $V_{SYS}$ would be $V_{SYS}=V_{BAT}+V_{DS}=V_{BAT}+10$ mV. The charging transistor Q2 in FIG. 3 is a N-type Filed Effect Transistor, the charging regulation signal VG has a first state of logic low and a second state of logic high. In another embodiment of the present invention, the charging transistor Q2 maybe a P-type Filed Effect Transistor, the charging regulation signal VG has a first state of logic high and a second state of logic low.

From the description of FIG. 3 and FIG. 4, in the first phase and the second phase of the CC charge stage, the charging current $I_{BAT}$ is only controlled by the charging current control loop 242, thus the charging current $I_{BAT}$ has no step during whole CC charge stage.

Figure 5A:
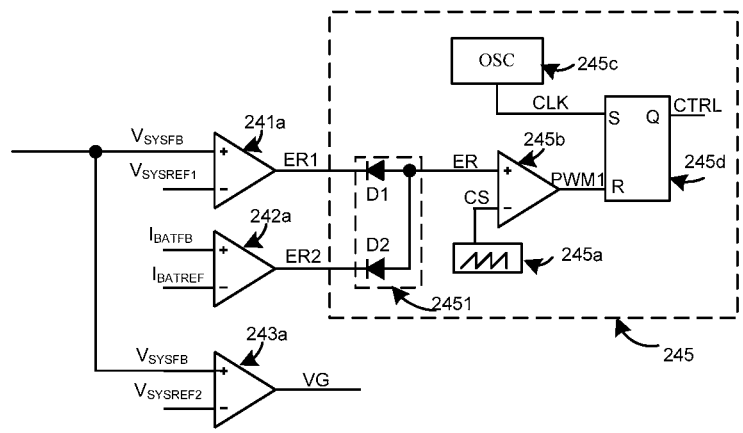
FIG. 5a illustrates a circuit block diagram of the control circuit 24 for controlling a switching circuit (Buck) employing peak current control mode according to an embodiment of the present invention.

FIG. 5a illustrates a circuit block diagram of the control circuit 24 for controlling a switching circuit (Buck) employing peak current control mode according to an embodiment of the present invention. In FIG. 5a, the system voltage control loop 241 comprises an operational amplifier 241a, the operational amplifier 241a has a first terminal to receive the system voltage reference signal $V_{SYSREF1}$ and a second terminal to receive the system voltage feedback signal $V_{SYSFB}$ indicative of the system voltage $V_{SYS}$, and an output terminal to provide the system voltage compensation signal ER1 based on the system voltage reference signal $V_{SYSREF1}$ and the system voltage feedback signal $V_{SYSFB}$. The charging current control loop 242 comprises an operational amplifier 242a, the operational amplifier 242a has a first terminal to receive the charging current reference signal $I_{BATREF}$, and a second terminal to receive the charging current feedback signal $I_{BATFB}$ indicative of the charging current $I_{BAT}$, and an output terminal to provide the charging current compensation signal ER2 based on the charging current feedback signal $I_{BATFB}$ and the charging current reference signal $I_{BATREF}$. The charging transistor control loop 243 comprises an operational amplifier 243a, the operational amplifier 243a has a first terminal to receive the charging transistor reference $V_{SYSREF2}$, and a second terminal to receive the system voltage feedback signal $V_{SYSFB}$, and an output terminal to provide the charging regulation signal VG to control the charging transistor Q2 based on the charging transistor reference signal $V_{SYSREF2}$ and the system voltage feedback signal $V_{SYSFB}$.

Referring still to FIG. 5a, the switching control circuit 245 comprises a selection circuit 2451, an inductor current detection circuit 245a, a comparator 245b, an oscillator 245c and an RS trigger 245d. The selection circuit 2451 is configured to receive the system voltage compensation signal ER1 and the charging current compensation signal ER2, and is configured to provide a compensation signal ER based on the system voltage compensation signal ER1 and the charging current compensation signal ER2. The inductor current detection circuit 245a is coupled to the inductor to generate an inductor current sense signal CS indicative of the current passing through an inductor of the switching circuit 21. The comparator 245b is configured to receive the compensation signal ER and the inductor current sense signal CS, and is configured to output a modulation signal PWM1. The oscillator 245c provides a clock signal CLK. In an embodiment, the clock signal CLK has a constant frequency. The RS trigger 245d has a set terminal to receive the clock signal CLK, a reset terminal to receive the modulation signal PWM, and an output terminal to provide the switching control signal CTRL to control the switching circuit 21.

Figure 5B:
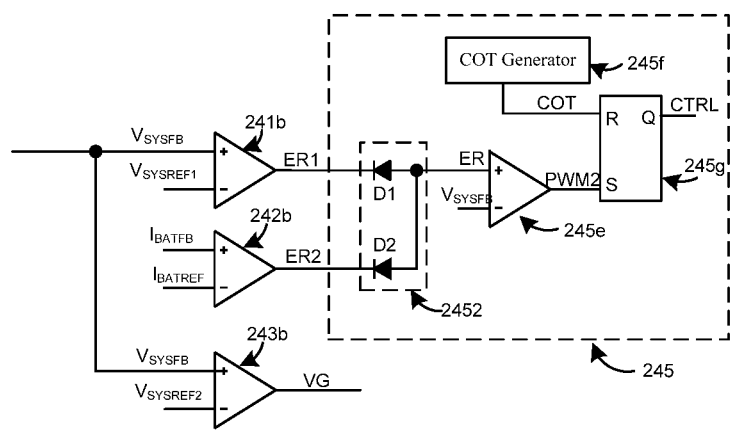
FIG. 5b illustrates a circuit block diagram of the control circuit 24 for controlling a switching circuit (Buck) employing COT (constant on time) control mode according to another embodiment of the present invention.

FIG. 5b illustrates a circuit block diagram of the control circuit 24 for controlling a switching circuit (Buck) employing COT (constant on time) control mode according to another embodiment of the present invention. The switching control circuit 245 comprises a selection circuit 2452, a comparator 245e, a constant on time generator 245f and an RS trigger 245g. The selection circuit 2452 has the same structure and function as the selection circuit 2451. The comparator 245e has a first terminal to receive the compensation signal ER, a second terminal to receive the system voltage feedback signal $V_{SYSFB}$, and an output terminal to provide a modulation signal PWM2 based on the compensation signal ER and the system voltage feedback signal $V_{SYSFB}$. The constant on time generator 245f provides a constant on time signal COT. In an embodiment, the constant on time signal COT is configured to control the at least one switch turned on for a period of time.

One of ordinary skill in the art should know that the specific circuit structure of the control circuit 24 is not limited as FIGS. 5a and 5b shown.

Figure 6A:
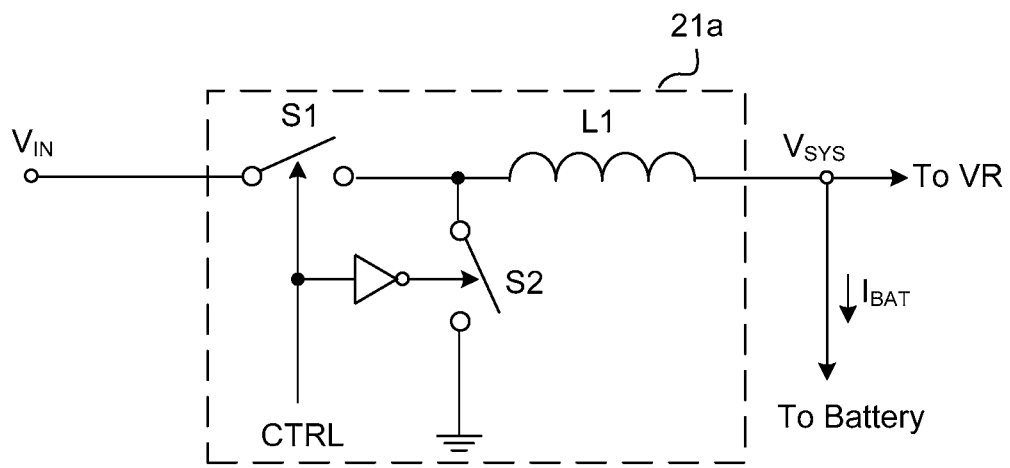
FIG. 6a-6c schematically illustrate the switching circuit 21 shown in FIG. 3 according to an embodiment of the present invention.
Figure 6B:
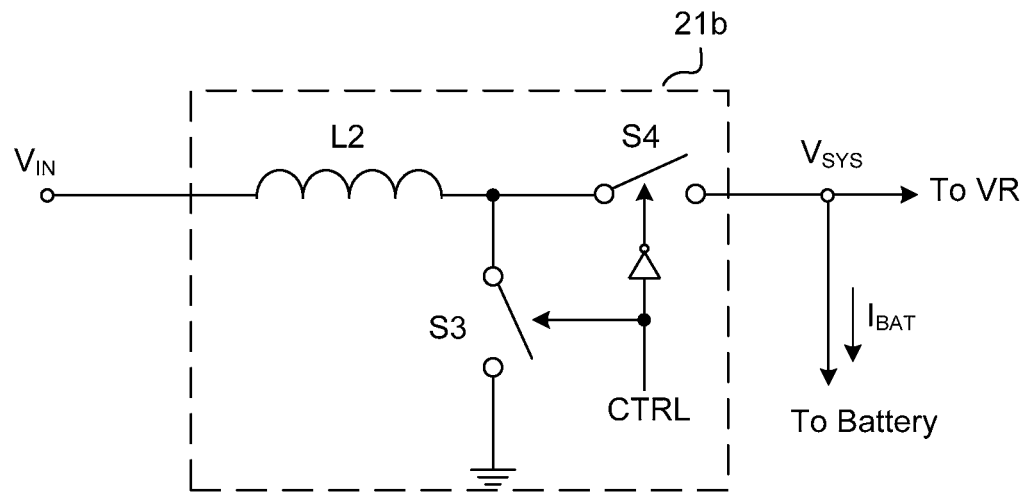
Figure 6C:
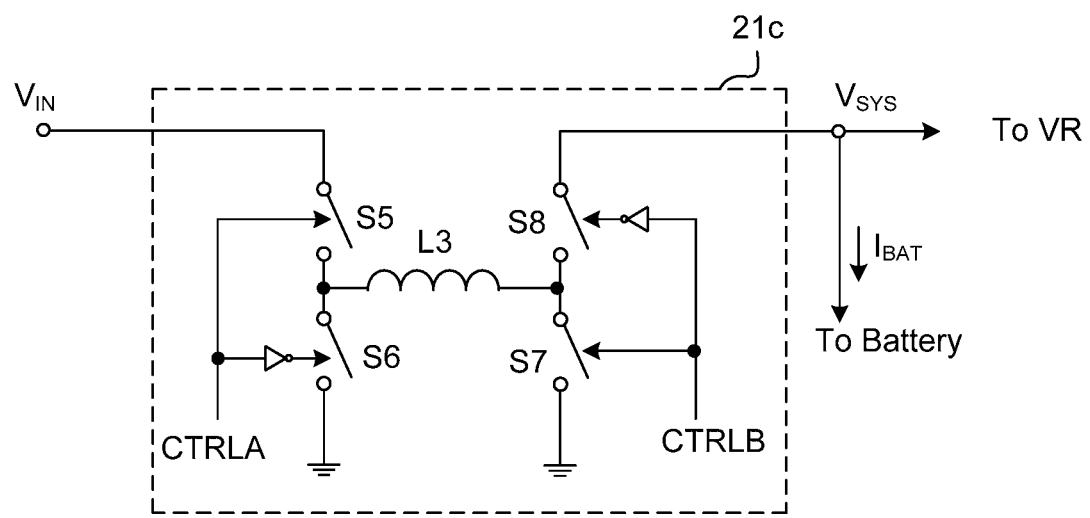

FIG. 6a-6c schematically illustrate the switching circuit 21 as shown in FIG. 3 according to an embodiment of the present invention. One of ordinary skill in this art should appreciate that specific circuit structure of switching circuit 21 is not limited as FIG. 6a-6c shown, other circuits may be also used without detracting from merits of the present invention.

FIG. 6a shows a switching circuit 21a employing a step-down (Buck) as one example. The switching circuit 21a comprises switches S1 and S2, and an inductor L1. The switch S1 has a first terminal coupled to the input terminal of the switching circuit 21a, and a second terminal. The switch S2 has a first terminal coupled to the second terminal of the switch S1 and a second terminal coupled to the reference ground. The inductor L1 has a first terminal coupled to the second terminal of the switch S1 and the first terminal of switch S2, and a second terminal coupled to the output terminal of the switching circuit 21a. The switches S1 and S2 are controlled to ON and OFF complementary by the switching control signal CTRL. In one embodiment, the switch S2 may be substituted by a diode.

FIG. 6b shows a switching circuit 21b employing a step-up (Boost) as one example. The switching circuit 21b comprises switches S3 and S4, and an inductor L2. The inductor L2 has a first terminal coupled to the input terminal of the switching circuit 21b, and a second terminal. The switch S3 has a first terminal coupled to the second terminal of the inductor L2 and a second terminal coupled to the reference ground. The switch S4 has a first terminal coupled to the second terminal of inductor L2 and the first terminal of the S4, and a second terminal coupled to the output terminal of the switching circuit 21b. The switches S3 and S4 are controlled to ON and OFF complementary by the switching control signal CTRL. In one embodiment, the switch S3 may be substituted by a diode.

FIG. 6c shows a switching circuit 21c employing a Buck-Boost as one example. The switching circuit 21c comprises switches S5-S8 and an inductor L3. The switch S5 has a first terminal coupled to the input terminal of the switching circuit 21c, and a second terminal. The switch S6 has a first terminal coupled to the second terminal of the switch S5, and a second terminal coupled to the reference ground. The switch S8 has a first terminal coupled to the second output terminal of the switching circuit 21c, and a second terminal. The switch S7 has a first terminal coupled to the second terminal of the switch S8, and a second terminal coupled to the reference ground. The inductor L3 has a first terminal coupled to the second terminal of the switch S5 and the first terminal of the switch S6, and a second terminal coupled to the first terminal of the switch S7 and the second terminal of the switch S8. The switches S5 and S6 are controlled to ON and OFF complementary by a first switching control signal CTRLA while the switches S7 and S8 are controlled to ON and OFF complementary by a second switching control signal CTRLB.

Figure 7:
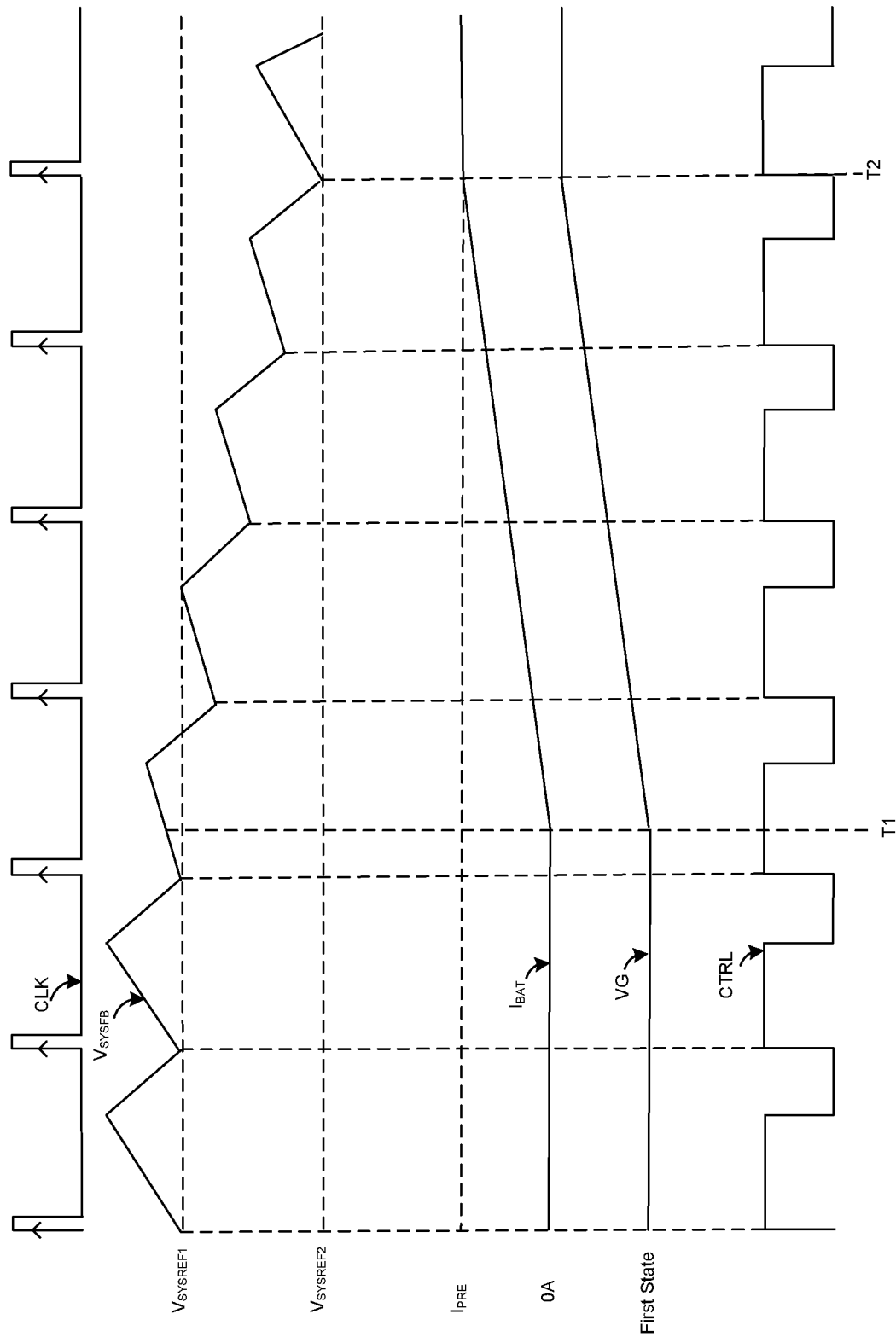
FIG. 7 illustrates the waveform of a battery charging circuit with a switching circuit (Buck) from the preparation stage to the pre-charge stage according to an embodiment of the present invention.

FIG. 7 illustrates the waveform of a battery charging circuit with a switching circuit (Buck) from the preparation stage to the pre-charge stage according to an embodiment of the present invention. The clock signal CLK in FIG. 7 has a constant frequency, the switching control signal CTRL transits from logic low to logic high to turn on the at least one switch of the switching circuit 21 at each of the rising edge of the clock signal CLK. The at least one switch keeps in on state for a period of time and is controlled to turn off at each of the falling edge of the clock signal CLK. Before the moment T1, the battery charging circuit works in the preparation stage, the charging regulation signal VG is in the first state of logic low to turn off the charging transistor Q2. The system voltage $V_{SYS}$ is controlled and maintained at a first voltage threshold V1. At the moment T2, the battery charging circuit enters the pre-charge stage, the charging current reference signal $I_{BATREF}$ equals the pre-charge current reference $I_{PREREF}$, and the charging current $I_{BAT}$ is controlled and maintained at the pre-charge current threshold $I_{PRE}$. The charging transistor Q2 is controlled to operate in its saturation region by the charging regulation signal VG. The on resistance $R_{DS}$ of the charging transistor Q2 operating in saturation region is variable and is tuned by the charging regulation signal VG to regulate and maintain the system voltage $V_{SYS}$ at the second voltage threshold V2, wherein the second voltage threshold V2 is less than the first voltage threshold V1. The period from the moment T1 to T2 is a transition period from the preparation stage to pre-charge stage.

Figure 8:
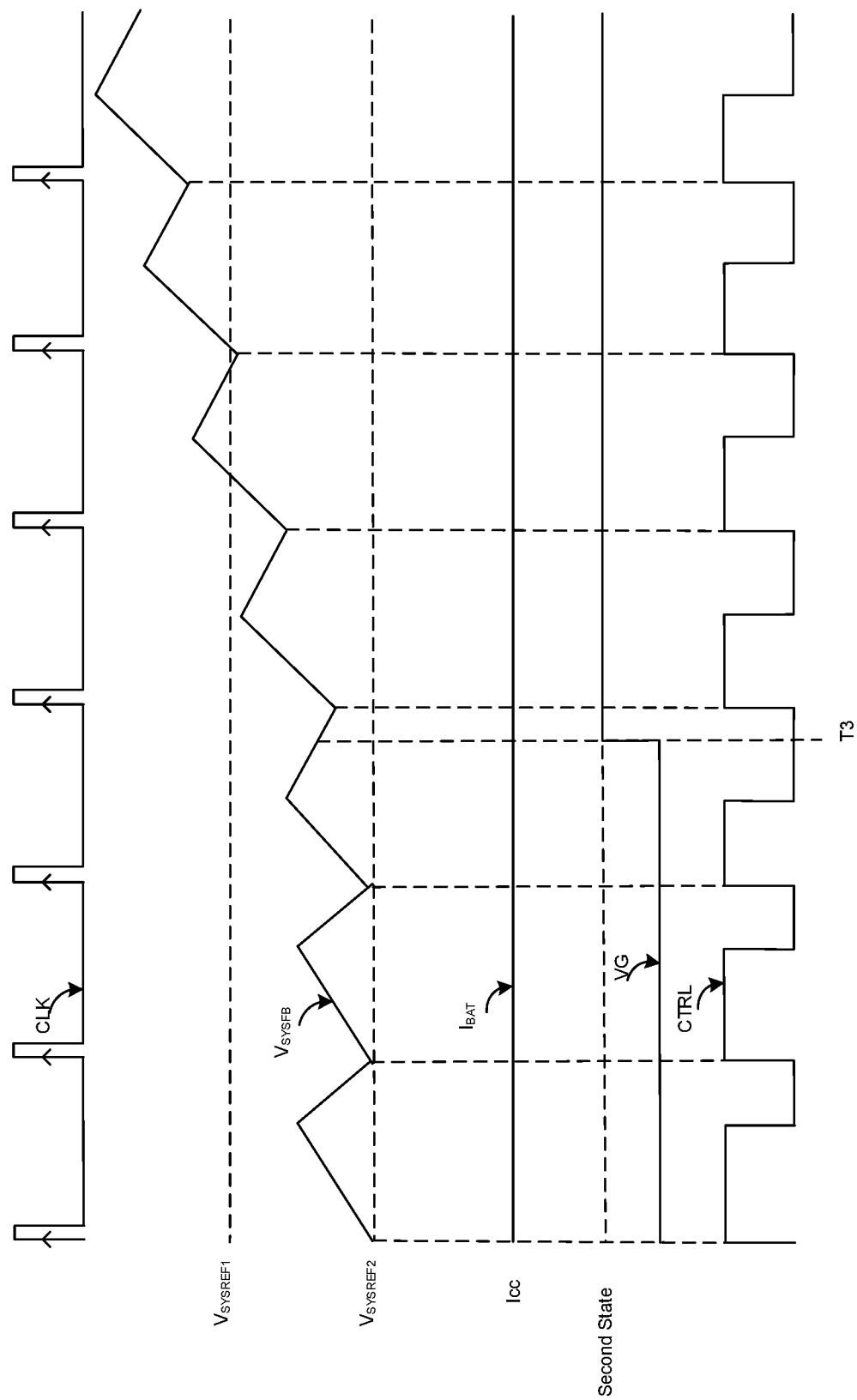
FIG. 8 illustrates the waveform of a battery charging circuit with a switching circuit (Buck) at the CC charge stage according to an embodiment of the present invention.

FIG. 8 illustrates the waveform of a battery charging circuit with a switching circuit (Buck) at the CC charge stage according to an embodiment of the present invention. The clock signal CLK in FIG. 8 has a constant frequency, the switching control signal CTRL transit form logic Low to logic high to turn on the at least one switch of the switching circuit 21 at of each of the rising edge of the clock signal CLK. The at least one switch keeps in on state for a period of time and is controlled to turn off at the falling edge of the clock signal CLK. Before the moment T3, the battery charging circuit works in the first phase of the CC charge stage. The charging current $I_{BAT}$ is controlled and maintained at the CC charge current threshold $I_{CC}$ by the charging current control loop 242, and the system voltage $V_{SYS}$ is controlled and maintained at a second voltage threshold V2 by the tuning the on resistance $R_{DS}$ of the charging transistor Q2. At the moment T3, the battery voltage $V_{BAT}$ increases and reaches the system voltage minimum threshold $V_{SYSMIN}$, the battery charging circuit enters the second phase of the CC charge stage, the charging current $I_{BAT}$ is controlled and maintained at the CC charge current threshold $I_{CC}$ by the charging current control loop 242, and the charging regulation signal VG is controlled in the second state by the charging transistor control loop 243, and the charging transistor Q2 is controlled to operate in its linear region.

Figure 9:
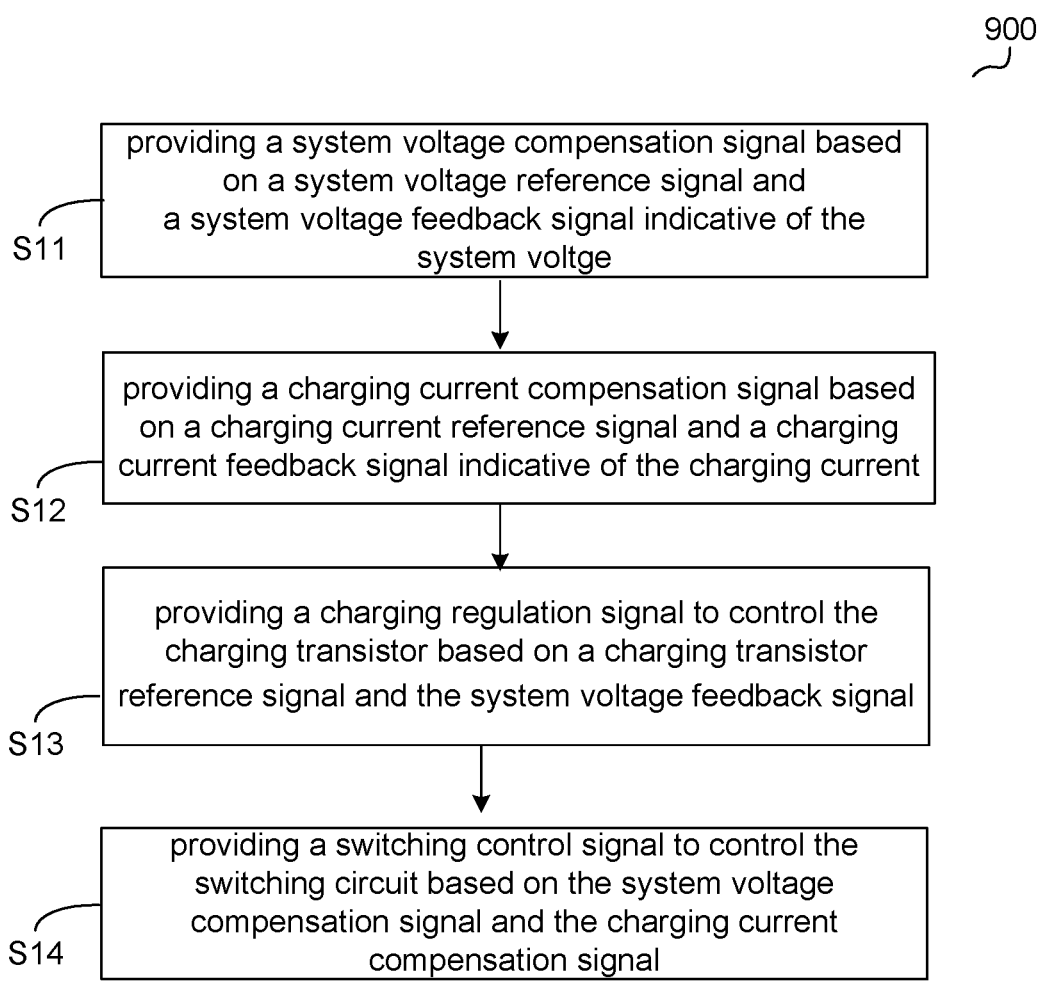
FIG. 9 illustrates a flow chart of method 900 for controlling a battery charging circuit according to one embodiment of the present invention.

FIG. 9 illustrates a flow chart of method 900 for controlling a battery charging circuit according to an embodiment of the present invention. The battery charging circuit comprising a switching circuit having an output terminal configured to provide a system voltage $V_{SYS}$, the output terminal of the switching circuit is further coupled to a battery to provide a charging current $I_{BAT}$ to the battery via a charging transistor, wherein the battery has a battery voltage $V_{BAT}$ indicative of the battery charging status, Method 900 comprises steps S11-S14.

At step S11, providing a system voltage compensation signal ER1 based on a system voltage reference signal $V_{SYSREF1}$ and a system voltage feedback signal $V_{SYSFB}$ indicative of the system voltage $V_{SYS}$.

At step S12, providing a charging current compensation signal ER2 based on a charging current reference signal $I_{BATREF}$ and a charging current feedback signal $I_{BATFB}$ indicative of the charging current $I_{BAT}$.

At step S13, providing a charging regulation signal VG to control the charging transistor based on a charging transistor reference signal $V_{SYSREF2}$ and a system voltage feedback signal $V_{SYSFB}$.

At step S14, providing a switching control signal CTRL to control the switching circuit 21 based on the system voltage compensation signal ER1 and the charging current compensation signal ER2.

In one embodiment, the step 13 comprises: if the battery voltage $V_{BAT}$ is less than a system voltage minimum threshold $V_{SYSMIN}$, the charging transistor is controlled to operate in its saturation region to regulate and maintain the system voltage $V_{SYS}$ at a second voltage threshold V2, and if the battery voltage $V_{BAT}$ is higher than the system voltage minimum threshold $V_{SYSMIN}$, the charging transistor is controlled to operate in its linear region.

In one embodiment, the step S14 comprises: when the switching control signal CTRL is provided in response to the system voltage compensation signal ER1, the system voltage $V_{SYS}$ is controlled and maintained at a first voltage threshold V1.

In one embodiment, the step 14 comprises: when the switching control signal CTRL is provided in response to the charging current compensation signal ER2, the charging current $I_{BAT}$ is controlled and maintained at a pre-charge current threshold $I_{PRE}$ or a CC charge current threshold $I_{CC}$, wherein the pre-charge current threshold $I_{PRE}$ is less than the CC charge current threshold $I_{CC}$. Specifically, when the switching control signal CTRL is provided in response to the charging current compensation signal ER2, and if the battery voltage $V_{BAT}$ is less than a pre-charge voltage threshold $V_{BATPRE}$, the charging current reference signal $I_{BATREF}$ equals a pre-charge current reference $I_{PREREF}$ and the charging current $I_{BAT}$ is controlled and maintained at the pre-charge current threshold $I_{PRE}$; and if the battery voltage $V_{BAT}$ is higher than the pre-charge voltage threshold $V_{BATPRE}$, the charging current reference signal $I_{BATREF}$ equals a CC charge current reference $I_{CCREF}$ and the charging current $I_{BAT}$ is controlled and maintained at the CC charge current threshold $I_{CC}$.

Note that in the flow chart described above, the box function may also be implemented with different order as shown in FIG. 9. Two successive box function maybe executed meanwhile, or sometimes the box functions maybe executed in reverse order, the specific orders depend on the specific function.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A control circuit for a battery charging circuit, the battery charging circuit having a switching circuit with an output terminal to provide a system voltage, the output terminal of the switching circuit is further coupled to a battery to provide a charging current to the battery via a charging transistor, wherein the battery has a battery voltage indicative of a battery charging status, the control circuit comprising:
a system voltage control loop, configured to receive a system voltage reference signal and a system voltage feedback signal indicative of the system voltage, and configured to provide a system voltage compensation signal based on the system voltage reference signal and the system voltage feedback signal;
a charging current control loop, configured to receive a charging current reference signal and a charging current feedback signal indicative of the charging current, and configured to provide a charging current compensation signal based on the charging current reference signal and the charging current feedback signal;
a charging transistor control loop, configured to receive a charging transistor reference signal and the system voltage feedback signal, and configured to provide a charging regulation signal to control the charging transistor based on the charging transistor reference signal and the system voltage feedback signal; and
a switching control circuit, configured to receive the system voltage compensation signal and the charging current compensation signal, and configured to provide a switching control signal to control the switching circuit based on the charging current compensation signal and the system voltage compensation signal;
wherein when the battery voltage is less than a system voltage minimum threshold and the charging current is zero, the switching control circuit is configured to provide the switching control signal to control and maintain the system voltage at a first voltage threshold based on the system voltage compensation signal; and
when the battery voltage is less than the system voltage minimum threshold and the charging current is not zero, the charging transistor is controlled to operate in its saturation region to regulate and maintain the system voltage at a second voltage threshold by the charging regulation signal, and wherein the second voltage threshold is less than the first voltage threshold.

2. The control circuit of claim 1, when the charging current control loop takes effect, the switching control circuit is configured to provide the switching control signal to control and maintain the charging current at a pre-charge current threshold or a CC charge current threshold based on the charging current compensation signal, wherein the pre-charge current threshold is less than the CC charge current threshold.

3. The control circuit of claim 2, wherein:
if the battery voltage is less than a pre-charge voltage threshold, the charging current reference signal equals a pre-charge current reference and the charging current is controlled and maintained at the pre-charge current threshold; and
if the battery voltage is higher than the pre-charge voltage threshold, the charging current reference signal equals a CC charge current reference and the charging current is controlled and maintained at the CC charge current threshold.

4. The control circuit of claim 1, when the battery voltage is higher than the system voltage minimum threshold, the charging transistor is controlled to operate in its linear region by the charging regulation signal.

5. The control circuit of claim 1, wherein the switching circuit comprises at least one switch and an inductor coupled to the at least one switch, the switching control circuit comprises:
a selection circuit, configured to receive the system voltage compensation signal and the charging current compensation signal, and configured to provide a compensation signal based on the system voltage compensation signal and the charging current compensation signal;
an inductor current detection circuit, configured to generate an inductor current sense signal indicative of a current passing through the inductor;
a comparator, configured to receive the compensation signal and the inductor current sense signal, and is configured to provide a modulation signal based on the compensation signal and the inductor current sense signal;
an oscillator, configured to provide a clock signal; and
an RS trigger, configured to receive the clock signal and the modulation signal, and configured to provide the switching control signal to control the at least one switch based on the clock signal and the modulation signal.

6. The control circuit of claim 1, wherein the switching circuit comprises at least one switch, the switching control circuit comprises:
  a selection circuit, configured to receive the charging current compensation signal and the system voltage compensation signal, and configured to provide a compensation signal based on the charging current compensation signal and the system voltage compensation signal;
  a comparator, configured to receive the compensation signal and the system voltage feedback signal, and configured to provide a modulation signal based on the compensation signal and the system voltage feedback signal;
  a constant on time generator, configured to provide a constant on time signal; and
  an RS trigger, configured to receive the constant on time signal and the modulation signal, and configured to provide the switching control signal to control the at least one switch based on the constant on time signal and the modulation signal.

7. A battery charging circuit, comprising:
  a switching circuit, having an output terminal configured to provide a system voltage, the output terminal of the switching circuit is further coupled to a battery to provide a charging current to the battery via a charging transistor, wherein the battery has a battery voltage indicative of a battery charging status;
  a system voltage control loop, configured to receive a system voltage reference signal and a system voltage feedback signal indicative of the system voltage, and configured to provide a system voltage compensation signal based on the system voltage reference signal and the system voltage feedback signal;
  a charging current control loop, configured to receive a charging current reference signal and a charging current feedback signal indicative of the charging current, and configured to provide a charging current compensation signal based on the charging current reference signal and the charging current feedback signal;
  a charging transistor control loop, configured to receive a charging transistor reference signal and the system voltage feedback signal, and configured to provide a charging regulation signal to control the charging transistor based on the charging transistor reference signal and the system voltage feedback signal; and
  a switching control circuit, configured to receive the system voltage compensation signal and the charging current compensation signal, and configured to provide a switching control signal to control the switching circuit based on the charging current compensation signal and the system voltage compensation signal;
  wherein when the battery voltage is less than a system voltage minimum threshold and the charging current is zero, the switching control circuit is configured to provide the switching control signal to control and maintain the system voltage at a first threshold voltage based on the system voltage compensation signal; and
  when the battery voltage is less than the system voltage minimum threshold and the charging current is not zero, the charging transistor is controlled to operate in its saturation region to regulate and maintain the system voltage at a second voltage threshold by the charging regulation signal, and wherein the second voltage threshold is less than the first voltage threshold.

8. The battery charging circuit of claim 7, when the charging current control loop takes effect, the switching control circuit is configured to provide the switching control signal to control and maintain the charging current at a pre-charge current threshold or a CC charge current threshold based on the charging current compensation signal, wherein the pre-charge current threshold is less than the CC charge current threshold.

9. The battery charging circuit of claim 8, wherein:
  if the battery voltage is less than a pre-charge voltage threshold, the charging current reference signal equals a pre-charge current reference and the charging current is controlled and maintained at the pre-charge current threshold; and
  if the battery voltage is higher than the pre-charge voltage threshold, the charging current reference signal equals a CC charge current reference and the charging current is controlled and maintained at the CC charge current threshold.

10. The battery charging circuit of claim 7, when the battery voltage is higher than the system voltage minimum threshold, the charging transistor is controlled to operate in its linear region by the charging regulation signal.

11. A control method for a battery charging circuit, the battery charging circuit having a switching circuit with an output terminal configured to provide a system voltage, the output terminal of the switching circuit is further coupled to a battery to provide a charging current to the battery via a charging transistor, wherein the battery has a battery voltage indicative of a battery charging status, the control method comprising:
  providing a system voltage compensation signal based on a system voltage reference signal and a system voltage feedback signal indicative of the system voltage;
  providing a charging current compensation signal based on a charging current reference signal and a charging current feedback signal indicative of the charging current;
  providing a charging regulation signal to control the charging transistor based on a charging transistor reference signal and the system voltage feedback signal; and
  providing a switching control signal to control the switching circuit based on the system voltage compensation signal and the charging current compensation signal;
  wherein when the battery voltage is less than a system voltage minimum threshold and the charging current is zero, the system voltage is controlled and maintained at a first voltage threshold in response to the system voltage compensation signal; and
  when the battery voltage is less than the system voltage minimum threshold and the charging current is not zero, the charging transistor is controlled to operate in its saturation region to regulate and maintain the system voltage at a second voltage threshold by the charging regulation signal, and wherein the second voltage threshold is less than the first voltage threshold.

12. The control method of claim 11, when the switching control signal is provided in response to the charging current compensation signal, the charging current is controlled and maintained at a pre-charge current threshold or a CC charge current threshold, wherein the pre-charge current threshold is less than the CC charge current threshold.

13. The control method of claim 12, wherein:
  if the battery voltage is less than a pre-charge voltage threshold, the charging current reference signal equals a pre-charge current reference and the charging current is controlled and maintained at the pre-charge current threshold; and if the battery voltage is higher than the pre-charge voltage threshold, the charging current reference signal equals a CC charge current reference and the charging current is controlled and maintained at the CC charge current threshold.

14. The control method of claim 11, when the battery voltage is higher than the system voltage minimum threshold, the charging transistor is controlled to operate in its linear region by the charging regulation signal.

\* \* \* \* \*